United States Patent [19]

Kenworthy et al.

[11] 4,072,008
[45] Feb. 7, 1978

[54] VARIABLE AREA BYPASS INJECTOR SYSTEM

[75] Inventors: Milton James Kenworthy, Cincinnati; Ivan Elmer Woltmann, West Chester, both of Ohio

[73] Assignee: General Electric Company, Lynn, Mass.

[21] Appl. No.: 682,951

[22] Filed: May 4, 1976

[51] Int. Cl.² .......................... F02K 3/08; F02K 3/06; F02C 3/06
[52] U.S. Cl. ........................... 60/261; 60/262; 60/39.66
[58] Field of Search ................ 60/261, 262, 39.66

[56] References Cited

U.S. PATENT DOCUMENTS

| | | | |
|---|---|---|---|
| 2,708,340 | 5/1955 | Rainbow et al. | 60/261 |
| 2,846,841 | 8/1958 | Jordan | 60/261 |
| 3,118,276 | 1/1964 | Keenan et al. | 60/261 |
| 3,866,417 | 2/1975 | Velegol | 60/261 |
| 4,010,608 | 3/1977 | Simmons | 60/262 |

Primary Examiner—Robert E. Garrett
Attorney, Agent, or Firm—Henry J. Policinski; Derek P. Lawrence

[57] ABSTRACT

An augmented mixed flow gas turbine engine is provided with a variable area bypass injector system which varies the area through which the bypass stream is injected into the core stream and which also selectively obtrudes cooling airflow to the augmentor liner. The ability to vary the area through which the bypass stream is injected into the core stream permits the mixed flow gas turbine engine of this invention to operate efficiently over a wide range of bypass ratios and further permits the total pressure of the bypass stream to be maintained at a level which will keep the engine inlet airflow matched to an optimum design level throughout a wide range of engine thrust settings. The ability to selectively obtrude cooling flow to the augmentor liner allows the augmentor cooling flow to be optimized for development of engine thrust during the augmented and non-augmented modes of operation and thereby further improve the operating range and efficiency of the engine of this invention.

11 Claims, 19 Drawing Figures

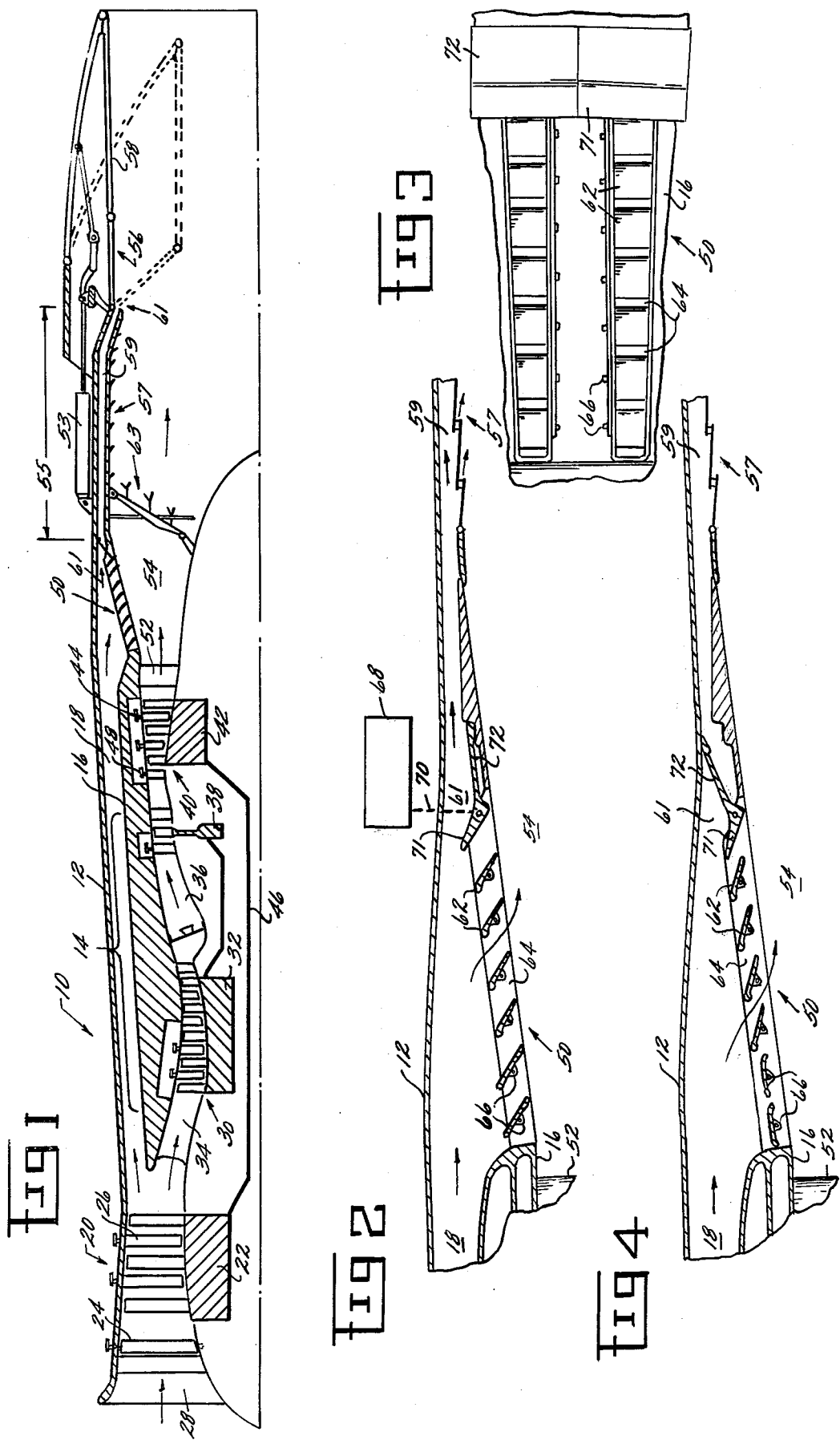

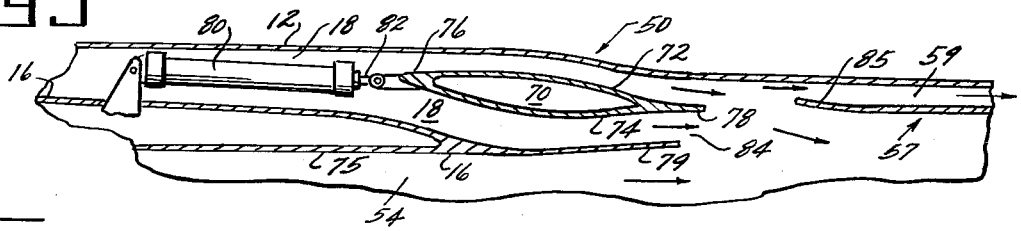
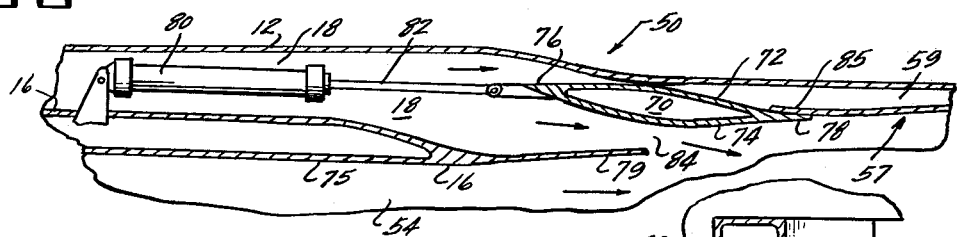
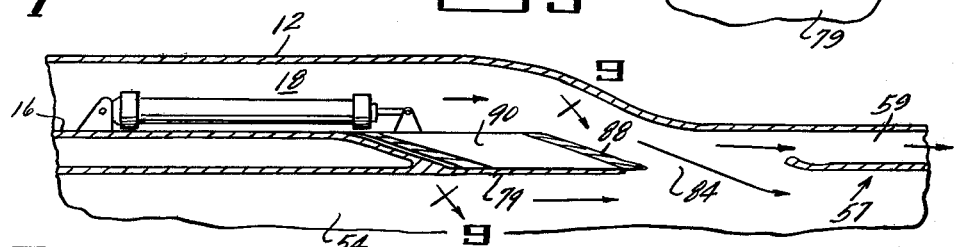
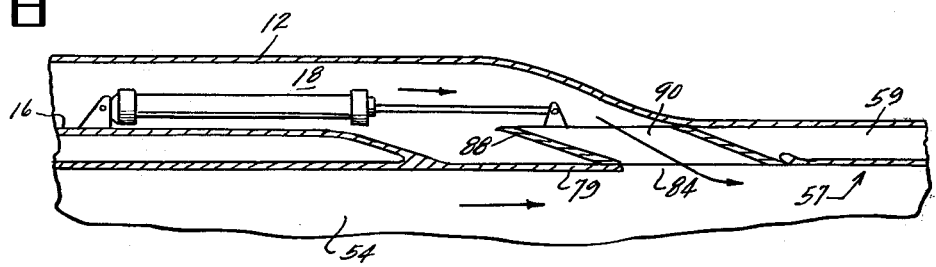
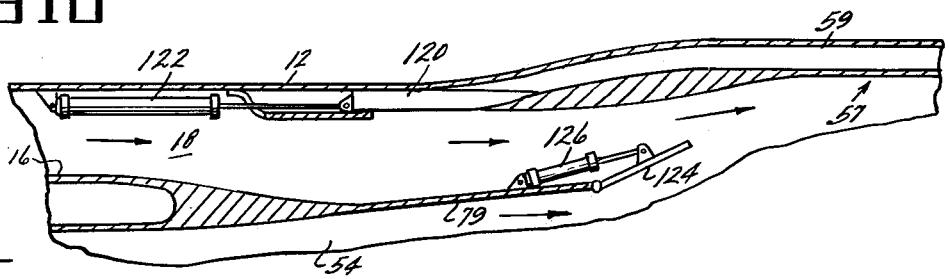
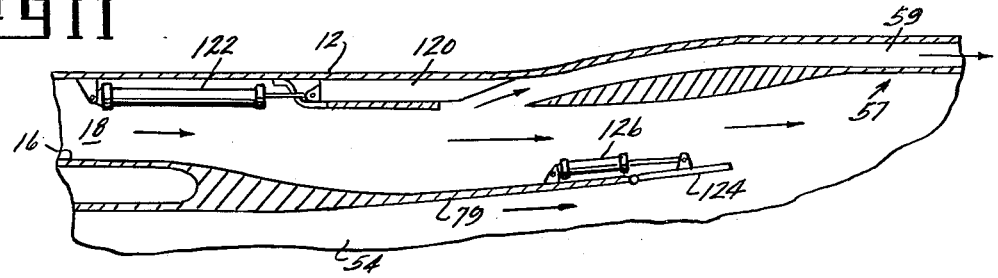

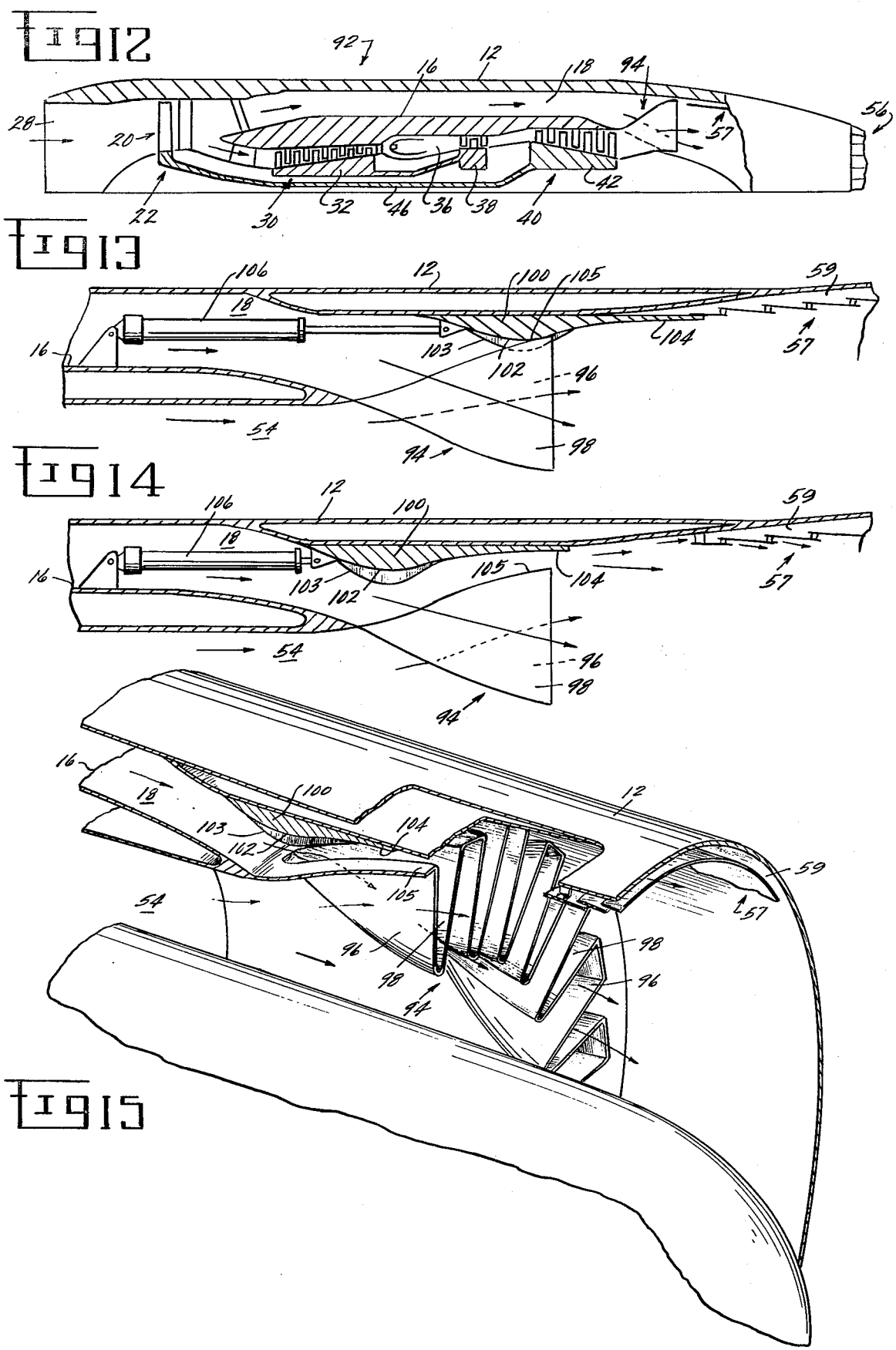

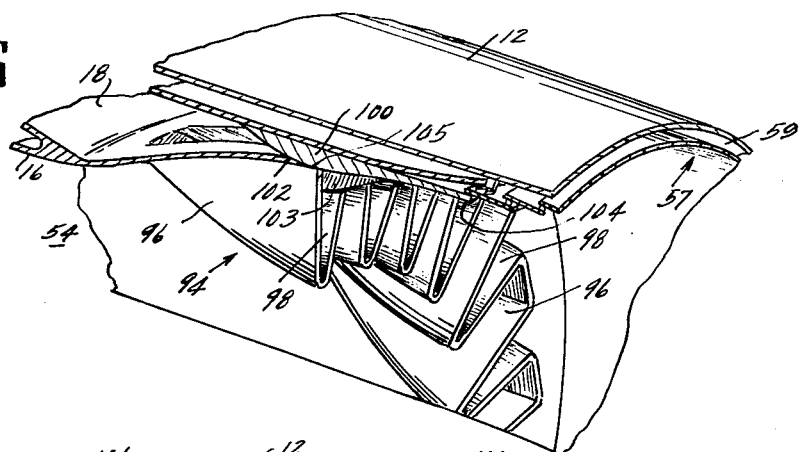
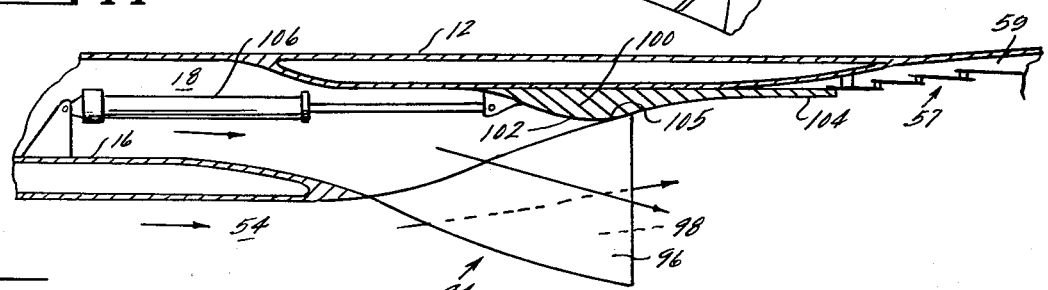
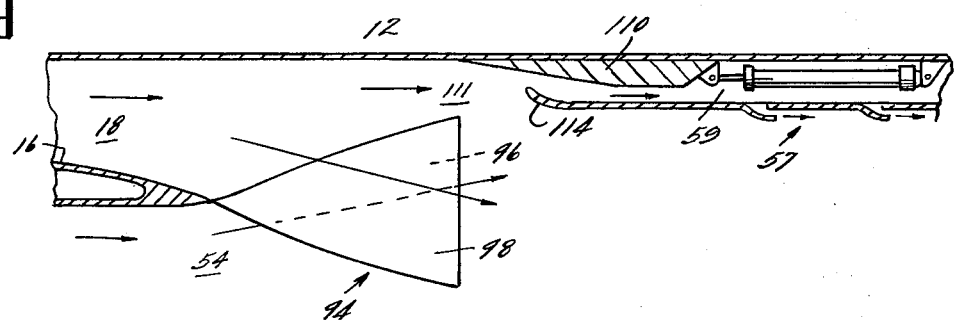
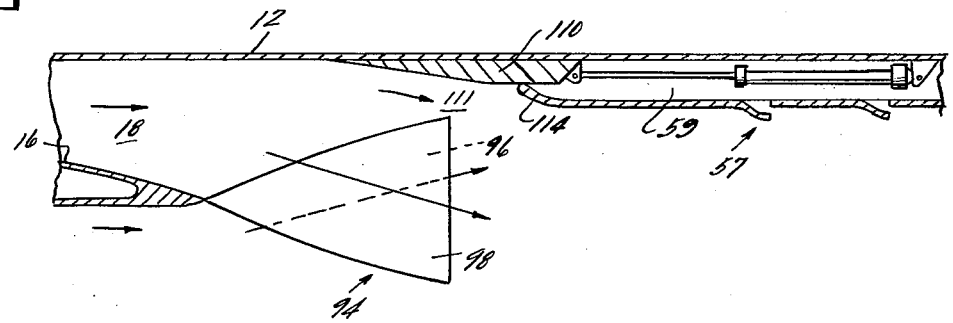

VARIABLE AREA BYPASS INJECTOR SYSTEM

BACKGROUND OF THE INVENTION

The invention relates to a mixed flow augmented gas turbine engine of the bypass type and, more particularly, to a mixed flow augmented gas turbine engine suitable for powering aircraft wherein the engine bypass ratio may be controlled to satisfy particular engine operating conditions.

Considerable attention has been devoted to developing a gas turbine engine with the high specific trust characteristics of a turbojet or low bypass turbofan at supersonic speeds which can also be configured to exhibit the lower specific thrust, low noise and low fuel consumption characteristics of a high bypass turbofan at subsonic speeds in order that a mixed-mission aircraft may be developed.

To this end, modern aircraft designers have worked to develop the aircraft engine design criteria which would enable the development of a suitable mixed-mission aircraft. Several design approaches to this problem have been offered. Such prior art systems have included various concepts of retractable fans, variable area turbines, variable pitch fans, as well as more complex techniques such as those utilizing combinations of turbofan and turbojet engines in tandem or concentric flow relation. In addition to a lack of flow flexibility, these arrangements have the obvious disadvantage of being inefficient due to the dead weight associated with those engine components not used in all modes of flight.

More recent attempts at developing practical variable bypass ratio engines include the selective direction of the inlet fan stream through alternative upstream fan ducts using inverter valves. While more effective than prior attempts at achieving satisfactory mixed-mission performance, such systems have exhibited several negative characteristics. These include the addition of extra undesired length, weight and complexity to the engine.

A further disadvantage of prior art variable bypass ratio engines is that they have failed to meet desired performance goals in all modes of operation because they have insufficient flow variability to maintain satisfactory engine performance in both supersonic and subsonic flight.

One of the reasons that prior art variable bypass mixed flow engines lack a high degree of flow variability is that the static pressures of the core and bypass streams must be balanced prior to mixing. In prior art mixed flow engines the static pressure of the bypass stream is controlled by setting the total pressure of the bypass stream. Thus, in order to balance the core and bypass stream pressures prior to mixing, the bypass stream total pressure and resultant static pressure must be maintained at a level at which the core and bypass stream static pressures are nearly equal immediately prior to mixing. However, since the engine bypass ratio which is defined as the ratio of the bypass flow to core stream flow is dependent upon the bypass stream total pressure, the core stream static pressure effectively determines the bypass ratio at which prior art engines may operate. This interdependence of the core stream static pressures in the mixing region and the total pressure of the bypass stream has prevented prior art variable bypass mixed flow engines from operating efficiently throughout a wide range of bypass ratios and flight Mach numbers.

Another reason prior art mixed flow engines have not operated efficiently throughout a variable velocity range is that they experience significantly high inlet drag levels during low thrust flight. Typically, the inlet of a gas turbine engine is sized to be full at the maximum thrust of the engine. However, as engine thrust is decreased below the maximum thrust, the engine airflow demand is considerably less than the total airflow supplied to the inlet. This excess airflow to the inlet causes inlet spillage drag which significantly increases the installed fuel consumption of prior art mixed flow engines.

One proposed solution to those problems of mixed flow gas turbine engines is disclosed in U.S. patent application Ser. No. 583,055, filed by D. J. Rundell et al on June 2, 1975 and assigned to the same assignee as this invention. The Rundell et al application discloses that a static pressure balance may be achieved between the core and bypass streams of a mixed flow gas turbine engine prior to mixing over widely varying bypass ratios while simultaneously maintaining the engine inlet airflow matched to an optimum design level at each bypass ratio by selectively varying the area through which the bypass stream is injected into the core stream. This invention includes several alternative embodiments to implement the teachings of the Rundell et al application on an augmented mixed flow gas turbine engine. Each variable area bypass injector (VABI) embodiment further improves on the teachings of the Rundell et al application by selectively obtruding cooling flow to the augmentor liner while simultaneously selectively varying the area through which the bypass stream is injected into the core stream.

OBJECT OF THE INVENTION

It is, therefore, a primary object of this invention to provide an augmented mixed flow gas turbine engine in which a static pressure balance may be achieved between the core and bypass streams prior to mixing at widely varying bypass stream total pressures.

It is also an object of this invention to provide an augmented mixed flow gas turbine engine having a high degree of flow modulation such that engine inlet airflow may be maintained at a matched design level as the engine thrust level and bypass ratio is varied in order that the engine will operate efficiently throughout a wide range of flight Mach numbers.

It is a further object of this invention to provide an augmented mixed flow gas turbine engine which may be configured to operate at various flight Mach numbers between subsonic and supersonic without any abrupt changes or discontinuities in engine airflow.

A still further object of this invention is to provide an augmented mixed flow gas turbine engine having a variable area bypass injector system for changing the area at which the bypass stream is injected into the core stream and selectively obtruding cooling flow to the augmentor liner.

SUMMARY OF THE INVENTION

These and other objects of the invention have been achieved in the preferred embodiment of the invention wherein a mixed flow gas turbine engine is provided with a fan; core engine comprising a compressor, combustor and high pressure turbine, all in series flow connection; and an annular duct concentric to the core engine for bypassing a portion of the fan airflow around the core engine. The gas stream exhausted from the high pressure turbine is directed to a low pressure turbine which drives the fan through an upstream extending drive shaft. The unique mixing device described herein is provided downstream of the core engine to mix the core and bypass gas streams and direct the mixed stream to an augmentor. The mixed stream exiting the augmentor is exhausted through a common variable area exhaust nozzle.

In order to control the static pressure of the bypass stream immediately upstream of the mixing region and maintain a static pressure balance between the core and bypass streams prior to mixing over a wide range of bypass stream total pressures, the mixing device includes a VABI which varies the area through which the bypass stream is injected into the core stream. To further improve the operating range and efficiency of this invention, the VABI also may be utilized to selectively obtrude cooling flow to the augmentor liner such that during the non-augmented mode of operation augmentor cooling flow may be terminated or during the augmented mode of operation the cooling flow may be partially restricted. Obtrusion of the liner flow during the non-augmented mode improves the operating efficiency of the engine by reducing the pressure loss of the bypass airflow and by improving the temperature uniformity of the mixed stream. Closure of the liner also permits operation of low bypass ratio engines at smaller bypass stream injection areas than would otherwise be possible with the liner open. Partially restricting or damming cooling flow to the augmentor liner during the augmented mode of operation permits modulation of liner cooling flow to meet the liner cooling requirements and thereby reduce excess cooling flow to the liner during the augmented mode of operation. This excess flow is burned in the augmentor to further improve the overall operating efficiency of the engine.

Additional variable geometry components may be added to the engine to achieve a greater degree of thrust modulation at varying bypass ratios. Thus, the low pressure turbine may be provided with a variable area nozzle diaphragm to assist in adjusting the low and high pressure turbine rotor speeds while allowing wide swings in low pressure turbine extraction rates during the high bypass mode of operation. The core engine compressor may be provided with sufficient variable geometry to permit stall-free operation from engine startup to full speed.

BRIEF DESCRIPTION OF THE DRAWINGS

The invention may be better understood upon reading the following description of the preferred embodiment in conjunction with the accompanying drawings wherein:

FIG. 1 is a cross-sectional view of an augmented mixed flow gas turbine engine incorporating the variable bypass concepts of this invention.

FIG. 2 is an enlarged fragmented view of a portion of the gas turbine engine of FIG. 1 illustrating the VABI of this invention in one mode of operation.

FIG. 3 is a top view of FIG. 2.

FIG. 4 is an enlarged fragmented view of the VABI of FIG. 2 in a different mode of operation.

FIG. 5 is a cross-sectional view of an alternative embodiment for the VABI of this invention in one mode of operation.

FIG. 6 is a cross-sectional view of the VABI of FIG. 5 in a different mode of operation.

FIG. 7 is a cross-sectional view of an alternative embodiment for the VABI of this invention in one mode of operation.

FIG. 8 is a cross-sectional view of the VABI of FIG. 7 in a differnet mode of operation.

FIG. 9 is a cross-sectional view taken along the line 9–9 of FIG. 7.

FIG. 10 is a cross-sectional view of an alternative embodiment of the VABI of this invention in one mode of operation.

FIG. 11 is a cross-sectional view of the VABI of FIG. 10 in a different mode of operation.

FIG. 12 is a cross-sectional view of an augmented mixed flow gas turbine engine with a lobed mixer incorporating the variable bypass concepts of this invention.

FIG. 13 is a cross-sectional view of the VABI of FIG. 12 in one mode of operation.

FIG. 14 is a cross-sectional view of the VABI of FIG. 12 in a different mode of operation.

FIG. 15 is a perspective view of the VABI of FIG. 12 in one mode of operation.

FIG. 16 is a perspective view of the VABI of FIG. 12 in a different mode of operation.

FIG. 17 is a cross-sectional view of an alternative embodiment for the VABI of FIG. 12.

FIG. 18 is a cross-sectional view of an alternative embodiment for the VABI of this invention in one mode of operation.

FIG. 19 is a cross-sectional view for the VABI of FIG. 19 in a different mode of operation.

DESCRIPTION OF THE PREFERRED EMBODIMENT

Referring to FIG. 1, there is shown a mixed flow gas turbine engine 10 having an outer casing or nacelle 12 spaced apart from an inner core engine 14 by an inner annular wall member 16 so as to define an annular bypass duct 18 therebetween. The mixed flow engine 10 includes a fan section 20 having a three-stage rotor 22, inlet guide vanes 24 and stators 26 disposed between rotor stages and extending radially inward from the outer nacelle 12. The fan section 20 receives the inlet airflow from an inlet shown generally at 28, and thereupon pressurizes the airflow, a portion of which is delivered to the core engine 14 and the remainder of which is directed to the bypass duct 18. The inlet 28 is sized to accept a predetermined design airflow. The core engine includes an axial flow compressor 30 having a rotor 32. Pressurized air entering the compressor 30 through a flow annulus 34 is compressed and then discharged to a combustor 36 where fuel is burned to provide high energy combustion gases which drive a high pressure turbine rotor 38. The high pressure turbine rotor 38 operates to extract energy from the high pressure core gas stream exiting the combustion chamber 36 to convert some of this energy into shaft horsepower for driving the rotor stages 32 of the compressor 30.

Disposed downstream of the high pressure turbine 38, in a position to receive the flow of hot gases leaving the core engine 14, is a low pressure turbine 40. The low pressure turbine 40 includes a rotor 42 and variable pitch stator sections 44. While the rotor 42 has been illustrated as comprising three stages, it will be apparent to those skilled in the art that a smaller or greater number of stages may be utilized depending upon the turbine energy extraction potential required. The stator sections 44 operate to convert energy from the core stream into shaft horsepower and to deliver this power to the rotor 42 which, in turn, drives the rotor 22 of fan section 20 through an upstream extending driveshaft 46 connected for rotation with rotors 22 and 42. For the purpose of providing additional control of the core engine flow, a variable area nozzle diaphragm 48 may be provided upstream of the low pressure turbine rotor 42.

The cross-sectional flow area to the low pressure turbine rotor 42 may be varied by varying the pitch of the variable nozzle diaphragm 48 and the variable stator sections 44 which vary the back pressure on the high pressure turbine rotor and thereby assist in adjusting the high pressure turbine rotor speed. Downstream of the core engine a variable area mixing device or variable area bypass injector (VABI) 50 is provided to mix the bypass duct flow with the combustion gases discharged from the low pressure turbine nozzle 52 in the region designated generally at 54 which also forms the inlet to an augmentor shown generally at 55.

The augmentor 55 is circumscribed by an intermediate nacelle or liner 57 which is spaced apart from the engine outer nacelle 12 so as to form a passage 59 therebetween. The passage 59 has its inlet 61 disposed approximately co-planar the inlet 54 to the augmentor 55 such that a portion of the bypass stream is directed into the passage 59 to provide cooling air for the augmentor 55. The outlet of the passage 59 terminates intermediate the augmentor 55 and a variable area converging-diverging exhaust nozzle 56 secured to the aft end of the nacelle 12. The augmentor 55 may be of any type well known in the art and includes a flameholder 63 which may be lighted to provide for reheat combustion of the mixed flow gases exiting the mixing device 50.

Propulsive force is obtained by the discharge of the mixed flow through the variable area converging-diverging exhaust nozzle 56. In order to assist in modulating the flow in the bypass duct and core engine, the area of the exhaust nozzle 56 may be varied by suitable variable geometry means well known in the art which, as illustrated, may comprise a linear actuator 53 controlling a hinged wall assembly 58 to vary the cross-sectional area of the exhaust nozzle 56 to accelerate the flow exhausting therefrom in the manner well known in the art.

In the embodiment of FIG. 1, the VABI 50, as best seen in FIGS. 2, 3 and 4, includes a plurality of rotatable core vanes 62 which span passage 64 in the inner wall 16 separating the bypass duct 18 and core engine 14 at a point downstream of the low pressure turbine 40. Each of the vanes 62 is mounted for rotation about their respective midpoint 66. The vanes 62 may be cascaded for simultaneous rotation by a suitable actuator means, which may comprise a linear actuator 68 acting through a control arm 70. Alternatively, the vanes 62 may be provided with separate control means (not shown) such that each may be independently rotated as shown in FIG. 4 to provide greater flexibility to the VABI 50. The rotatable vanes 62 provide the means by which the area through which the bypass stream is injected into the region of confluence 54 with the core stream is varied. Rotation of the vanes 62 to a near vertical position as shown in FIGS. 1 and 2 increases the area through which the bypass stream is injected into the mixing region 54 while rotating one or more of the vanes 62 to a near horizontal position decreases the area through which the bypass stream is injected into the region 54. This mode of operation is best illustrated in FIG. 4 wherein the two extreme upstream vanes 62 have been rotated to a fully closed position to further restrict airflow through the passages 64 and the remaining vanes 62 have been rotated to a near horizontal position.

The ability to vary the area at which the bypass stream is injected into the region 54 permits the mixed flow engine of this invention to achieve a static pressure balance between the core and bypass streams prior to mixing at widely varying bypass ratios. In operation, the desired thrust level and bypass ratio is set by adjusting the total pressure levels of the core and bypass stream. Contemporaneous therewith, the vanes 62 are rotated to either decrease or increase the area through which the bypass stream is injected into the core stream as required to maintain a static pressure balance between the core and bypass streams prior to mixing. Decreasing the area through which the bypass stream is injected into the core stream increases the velocity of the bypass stream and thereby its total pressure relative to its static pressure such that a static pressure balance is achieved at a new bypass ratio. Similarly, increasing the area through which the bypass stream is injected into the core stream decreases the velocity of the bypass stream and thereby its total pressure relative to its static pressure such that a static pressure balance is achieved at a different bypass ratio. The added flexibility which the VABI 50 provides in adjusting the static pressure of the bypass stream immediately prior to mixing enables a single static pressure level of the bypass stream immediately upstream of the mixing region to be achieved at varying bypass stream total pressure levels and thereby enables the core and bypass stream static pressures to be balanced prior to mixing throughout a wide range of engine bypass ratios, thus permitting the operating condition to be selected for the desired total engine airflow or for the most efficient cycle match of turbine work extraction and fan operating map. Use of separate actuators for the vanes 62 also permits selectively varying some of the vanes 62 to control the angle at which the bypass stream is injected into the core stream to achieve an optimum thrust angle and optimum penetration and mixing angle for varying engine operating conditions.

The VABI 50 also permits the airflow to the engine inlet 28 to be maintained at a matched design level throughout a wide range of engine thrust levels thereby avoiding the inlet spillage drag associated with prior art mixed flow engines and significantly increasing installed fuel consumption. In low thrust flight, the engine airflow demand is prevented from falling below the airflow supplied to the inlet by increasing the total pressure level of the bypass stream and resultant bypass ratio. A static pressure balance is maintained between the core and bypass streams prior to mixing by suitably adjusting the area through which the bypass stream is injected into the core stream utilizing the VABI 50.

In accordance with another feature of this invention, the extreme downstream vane 71 includes an annular valve extension 72 which may be used to obtrude cooling airflow to the augmentor liner 57. Thus, rotation of the extreme downstream vane 71 in a counter-clockwise direction causes the valve extension 72 to abut the nacelle 12, as best seen in FIG. 4, thereby to block the entrance to the cooling passage 59 and obtrude cooling airflow therethrough. Similarly, rotation of the extreme downstream vane 71 in a clockwise direction causes the valve extension 72 to abut the liner 57, as best seen in FIG. 2, and thereby open the inlet 61 to the passage 59 to permit cooling air to flow therethrough. The ability to selectively obtrude cooling flow to the augmentor liner further improves the operating efficiency of the engine of this invention. Thus, during the non-augmented cruise mode of operation, the augmentor cooling flow may be obtruded and redirected through the VABI 50. In this manner, the liner cooling flow is utilized more effectively for production of engine thrust when augmentor cooling is not required since the flow incurs less pressure loss through the VABI 50 than through the liner passage 59. Furthermore, the liner flow, when passing through the VABI 50, mixes effectively with the core stream to provide a more uniform exit temperature profile than could be obtained if the liner flow were allowed to pass through the liner passage 59 and exit the liner passage 61 without mixing with the core stream.

During the augmented mode of operation, the extreme down-stream vane 72 could selectively be rotated counter-clockwise to restrict the flow and increase the pressure loss at the liner entrance 61 and thereby control the amount of airflow entering the liner passage 59 for cooling purposes. That portion of the liner flow that is restricted from entering the liner passage then passes through the VABI 50 to be burned in the augmentor 55, thereby providing an additional increment of thrust not obtainable if the liner entrance were not restricted. Partial restriction of the liner during the augmented mode of operation is feasible when the fan-to-core stream total pressure ratio is greater than that for which the liner is designed. At such conditions, the liner passage ingests more cooling flow than necessary for cooling purposes.

Referring to FIGS. 5 and 6, therein is shown an alternative embodiment for the VABI 50 of this invention. In this embodiment the VABI 50 comprises an aerodynamically contoured annular ring 70 having inner and outer convex faces 72 and 74 respectively and generally sharp leading and trailing edges 76 and 78 respectively. The ring 70 is disposed in the bypass duct 18 intermediate and spaced apart from the outer nacelle 12 and a flow splitter 79 formed integral with the engine inner casing 75. A suitable linear actuator 80 having a control arm 82 in driving engagement with the ring 70 is provided to translate the ring in the passage 18. The ring 70 is contoured and disposed in the passage 18 such that upstream translation of the ring causes progressive restriction of the area 84 through which the bypass stream is injected into the core stream. The trailing edge 78 of the ring 70 cooperates with an annular outwardly curved extension 85 of the upstream end of the liner 55 such that when the ring 70 is fully translated in a downstream direction, as best seen in FIG. 6, liner cooling flow in the passage 69 is obtruded. In this position, the ring 70 also provides restriction of the bypass flow discharge area 84, which is preferred for the non-augmented cruise mode of operation. For augmented operation, the ring 70 may be retracted, as shown in FIG. 5, such that cooling flow to the augmentor liner 57 is unobtruded and the area through which the bypass flow is injected into the core stream is increased as is required to maintain a static pressure balance between the two streams prior to mixing. Intermediate positions of the ring 70, as translated aft toward the entrance to the liner 57, provide decreased fan discharge area and increased restriction of the liner entrance.

Referring to FIGS. 7, 8, and 9, therein is shown still another alternative embodiment for the VABI 50 of this invention. This embodiment is essentially the same as that of FIGS. 5 and 6 except that the translating ring includes a plurality of circumferentially spaced ducts 90, the combined cross-sectional flow area of which is less than the cross-sectional flow area 84 forming the inlet to the augmentor liner 57. In the extreme upstream position of the ring 88, as shown in FIG. 7, airflow through the ducts 90 is minimal since the outlet to the ducts is blocked by the flow splitter 79. In this position, the flow through the bypass duct 18 flows over the ring 88 and is discharged through the passage 84 and the augmentor cooling passage 59. Downstream translation of the ring 88 places the passages 90 in flow communication with the augmentor inlet 84 thereby to vary the area 84 through which the bypass stream is injected into the core stream and restrict the flow entering the liner. When fully translated in the downstream direction, as shown in FIG. 8, the ring 88 obtrudes cooling flow to the passage 59. This embodiment offers the advantage that the fan flow area may be varied from fully annular at takeoff or high thrust conditions to discrete penetrating jets to achieve improved mixing and lower skin friction losses during non-augmented cruise flight.

Referring to FIGS. 10 and 11, wherein like numbers refer to previous identified components, therein is shown still another alternative embodiment for the VABI of this invention. In this embodiment, a translating ring 120 under control of a suitable linear actuator 122 is secured to the outer nacelle 12 to provide a mechanism to totally obtrude cooling flow to the liner passage 59, as shown in FIG. 11, or restrict the liner flow by actuating the ring 120 to any position between that shown in FIGS. 10 and 11. Further, an annular flap 124 pivotally hinged to the downstream end of the flow splitter 79 and under control of a suitable linear actuator 126 is provided to simultaneously vary the injection area of the bypass stream and core stream.

Referring to FIGS. 12 through 17, wherein like numbers refer to previously identified components, therein is shown a gas turbine engine 92 incorporating an alternative embodiment for the VABI of this invention. The engine 92 is essentially the same as that disclosed in FIG. 1 except that in order to provide for increased mixing of the bypass and core streams, a lobed mixer 94 is disposed between the low pressure turbine 42 and exhaust nozzle 56. The mixer 94 includes a plurality of alternating hot chutes 96 disposed to receive the hot gases exhausted from the low pressure turbine 40 and cold chutes 98 in flow communication with the bypass duct 18. In order to control the area through which the bypass stream is injected into the core stream, an annular ring 100 is translatably mounted on the outer nacelle 12. The ring 100 may include a single circumferentially extending convex face 102 as best seen in FIG. 17. Alternatively the ring 100 may be provided with a plurality of circumferentially alternating spaced convex faces 103 extending radially inward beyond the convex faces 102 into the respective cold chutes 98 as best seen in FIGS. 13 through 16. A suitable linear actuator 106 is provided to translate the ring 100 along the outer nacelle 12. The convex faces 102 and 103 of the ring 100 cooperates with respective walls 105 of the mixer chutes to vary the area through which the fan stream is discharged into core stream. The trailing edge 104 of the ring 100 is used to restrict flow to the liner as the ring 100 translates aft. The liner flow is totally obtruded from the augmentor cooling passage 59 when the ring 100 is translated in its full downstream direction as best seen in FIGS. 13, 16 and 17. This position also provides the greatest restriction of the area through which the bypass stream is injected into the core stream. This embodiment offers the advantage that the increased length between the mixing chutes and flameholder reduces flameholder drag and the further advantage that the area of the cold chutes is varied with a single actuation mechanism.

Referring to FIGS. 18 and 19, therein is shown an alternative arrangement for a VABI for the engine of FIG. 12. In this embodiment, an annular ring 110, translatably mounted in the liner passage 59, extends upstream such that the ring 110 restricts the annular discharge area 111 above the chutes 98 as well as the entrance to the liner passage 59. When fully translated in the upstream direction, as best seen in FIG. 19, the ring 110 abuts the outwardly curved extension 114 of the augmentor liner 57 such that cooling flow in the passage 59 is obtruded. This embodiment has special application to low bypass ratio engines wherein during those modes of operation in which it is desired to obtrude cooling flow to the liner passage 59, obtrusion by downstream ring translation may block more bypass duct area than is required to match the static pressures of the core and bypass streams and thereby jeopardize engine stability. This embodiment also has the advantage that the translating ring 110 directs flow away from the liner 57 to provide improved mixing and reduced skin friction pressure loss.

It is well known that installed drag, usually associated with low engine airflow, can normally be substantially reduced by holding the engine airflow at its maximum power level, while simultaneously increasing the exhaust nozzle area. In conventional mixed flow engines, the total pressure level of the bypass stream is strongly influenced by the area level maintained in the exhaust nozzle. Increasing the exhaust nozzle area decreases the total pressure in the bypass stream which often causes the low pressure compressor to operate at low efficiency, thereby offsetting any improvements in installed fuel consumption gained by increasing the exhaust nozzle area. The ability to modulate the bypass stream total duct pressure of the present invention independent of the exhaust nozzle area and the ability to independently control the operating conditions of the low pressure turbine makes it possible to accomplish the afore-mentioned reduction in afterbody drag by increasing the exhaust nozzle area while maintaining a relatively high bypass duct pressure.

Various changes could be made in the structure shown in FIGS. 1 through 19 without departing from the scope of the invention. For simplicity in design, the number of variable geometry components utilized has been kept to the minimum necessary to achieve the desired degree of flow variability; however, it is also possible to utilize other variable geometry components such as variable pitch rotor blades for the fan and turbine sections in order to achieve additional flexibility in flow modulation without departing from the scope of the invention.

Therefore, having described preferred embodiments of the invention, though not exhaustive of all possible equivalents, what is desired to be secured by Letters Patent of the United States is claimed below.

What is claimed is:

1. An improved gas turbine engine of the type having an inlet for supplying a gas flow to a core engine, duct means for bypassing a portion of the inlet gas flow around the core engine, a mixer for injecting the bypass stream into the core engine exhaust stream, an augmentor for receiving the mixed streams and directing them to an exhaust nozzle and an annular passage circumscribing the augmentor to provide cooling flow thereto wherein the improvement comprises:
   a Variable Area Bypass Injector (VABI) including means for varying the cross-sectional area through which the bypass stream is injected into the core engine exhaust stream whereby the static pressure of the bypass stream may be matched to the static pressure of the core engine exhaust stream prior to mixing the two streams and further including means for selectively obtruding cooling flow to the augmentor, and
   wherein said means for selectively obtruding cooling flow to the augmentor is formed as a structural part of, and moves concurrently with, the means for varying the cross-sectional area through which the bypass stream is injected into the core engine exhaust stream.

2. The gas turbine engine of claim 1 wherein the mixer comprises a passageway placing the bypass duct means in flow communication with the core engine exhaust stream.

3. The gas turbine engine of claim 2 wherein the VABI comprises:
   a plurality of rotatable vanes spanning the passageway,
   actuator means for rotating the vanes about their respective center axis so as to vary the cross-sectional flow area through the passageway.
   wherein the most downstream vane includes an annular valve extension positioned such that rotation of the most downstream vane in a counter-clockwise direction causes the annular valve extension to restrict cooling flow to the annular passage circumscribing the augmentor, and
   wherein the annular valve extension obtrudes cooling flow to the augmentor liner when rotated in an extreme counter-clockwise position.

4. The gas turbine engine of claim 2 wherein the VABI comprises:
   an annular ring translatably mounted within the bypass duct means such that downstream translation of the ring restricts the mixer passageway and liner entrance and upstream translation of the ring increases the cross-sectional flow area of the mixer passageway, and
   wherein the ring obtrudes cooling flow to the augmentor liner when fully translated downstream.

5. The gas turbine engine of claim 4 wherein the translatable ring includes a plurality of circumferentially spaced flow slot passages disposed therein.

6. The gas turbine engine of claim 2 wherein the VABI comprises:
   an aerodynamically contoured annular ring having inner and outer convex faces and generally sharp leading and trailing edges translatably disposed within the bypass duct means and spaced apart from the bypass duct means such that bypass duct airflow surrounds the ring,
   wherein downstream translation of the ring causes progressive restriction of the mixer passageway and liner entrance and
   wherein the ring obtrudes cooling flow to the augmentor liner when fully translated downstream.

7. The gas turbine engine of claim 2 wherein the bypass duct means includes inner and outer walls and wherein the VABI comprises:
   annular flap means pivotally hinged to the inner wall of the bypass duct means for varying the cross-sectional flow area of the passageway,
   and annular ring means translatably mounted in the bypass duct means on the outer wall thereof for selectively restricting cooling flow to the augmentor liner, 8. The gas turbine engine of claim 1 wherein the mixer comprises:
   a plurality of alternating hot chutes having an inlet in flow communication with the core engine exhaust and an outlet in flow communication with the augmentor, and
   plurality of cold chutes having an inlet in flow communication with the bypass duct means and an outlet in flow communication with the augmentor.

9. The gas turbine engine of claim 8 wherein the VABI comprises:
   an annular ring having a generally convex face extending into the bypass duct means said ring being translatably mounted within the bypass duct means such that downstream translation of the ring progressively decreases the flow area of the cold chutes and simultaneously progressively restricts the entrance to the augmentor liner whereby the ring obtrudes cooling flow to the augmentor liner when fully translated downstream.

10. The gas turbine engine of claim 8 wherein the VABI comprises:
    an annular ring having a plurality of circumferentially spaced convex faces each extending into respective cold chutes, said ring being translatably mounted within the bypass duct means such that downstream translation of the ring progressively decreases the flow area of the cold chutes and simultaneously progressively restricts the entrance to the augmentor liner whereby the ring obtrudes cooling flow to the augmentor liner when fully translated downstream.

11. The gas turbine engine of claim 8 wherein the VABI comprises an annular ring having a generally convex face extending into the annular passage circumscribing the augmentor liner said ring being translatably mounted within said annular passage such that upstream translation of the ring progressively decreases the flow area of the cold chutes and simultaneously progressively restricts cooling flow to the augmentor liner whereby the ring obtrudes cooling flow to the augmentor liner when fully translated upstream.

* * * * *